United States Patent [19]

Kawamura

[11] Patent Number: 4,752,822
[45] Date of Patent: Jun. 21, 1988

[54] COLOR HALFTONE IMAGE PROCESSING APPARATUS PRODUCING VARIOUS SCREEN ANGLES AND HAVING AN ADAPTIVE COLOR IMAGE DATA CONVERSION LOOK-UP TABLE AND A SMALL-CAPACITY MASKING MEMORY

[75] Inventor: Naoto Kawamura, Yokohama, Japan

[73] Assignee: Canon Kabushiki Kaisha, Tokyo, Japan

[21] Appl. No.: 29,386

[22] Filed: Mar. 23, 1987

Related U.S. Application Data

[63] Continuation of Ser. No. 586,775, Mar. 6, 1984, abandoned.

[30] Foreign Application Priority Data

Mar. 8, 1983 [JP] Japan ................................ 58-37722
May 16, 1983 [JP] Japan ................................ 58-84036
May 16, 1983 [JP] Japan ................................ 58-84037
Jul. 13, 1983 [JP] Japan ................................ 58-127412

[51] Int. Cl.⁴ .......................... G03F 3/08; H04N 1/40; H04N 1/46
[52] U.S. Cl. ........................................ 358/80; 358/75; 358/283
[58] Field of Search ................... 358/75, 75 IJ, 78, 80, 358/76, 283, 298

[56] References Cited

U.S. PATENT DOCUMENTS

| | | | |
|---|---|---|---|
| 3,612,753 | 10/1971 | Korman | 358/80 |
| 3,893,166 | 7/1975 | Pugsley | 358/80 |
| 4,037,249 | 7/1977 | Pugsley | 358/76 |
| 4,058,828 | 11/1977 | Ladd | 358/80 |
| 4,075,662 | 2/1978 | Gall | 358/80 |
| 4,270,141 | 5/1981 | Sakamoto | 358/78 |
| 4,275,413 | 6/1981 | Sakamoto et al. | 358/80 |
| 4,285,009 | 8/1981 | Klopsch | 358/76 |
| 4,346,402 | 8/1982 | Pugsley | 358/80 |
| 4,481,532 | 11/1984 | Clark et al. | 358/80 |
| 4,507,685 | 3/1985 | Kawamura | 358/283 |
| 4,511,989 | 4/1985 | Sakamoto | 358/80 |
| 4,517,605 | 5/1985 | Yokomizo | 358/283 |
| 4,534,059 | 8/1985 | Yamada | 358/80 |
| 4,561,016 | 12/1985 | Jung et al. | 358/80 |
| 4,626,901 | 12/1986 | Tanioka | 358/75 |

FOREIGN PATENT DOCUMENTS

| | | | |
|---|---|---|---|
| 2301393 | 7/1974 | Fed. Rep. of Germany | 358/80 |
| 86353 | 7/1979 | Japan . | |
| 117478 | 9/1981 | Japan | 358/283 |
| 54473 | 3/1982 | Japan | 358/75 IJ |
| 24457 | 2/1983 | Japan . | |
| 652578 | 3/1979 | U.S.S.R. | 358/75 |

OTHER PUBLICATIONS

Stucki, P., "Electronic Halftoning for Color Reproduction", IBM Technical Disclosure Bulletin, vol. 20, No. 6, Nov. 1977, pp. 2423–2425.

Primary Examiner—James J. Groody
Assistant Examiner—Randall S. Svihla
Attorney, Agent, or Firm—Fitzpatrick, Cella, Harper & Scinto

[57] ABSTRACT

An image processing apparatus includes a generator for generating predetermined image data representing an image and an image reproducing device for reproducing the image. A reading device reads the image reproduced by the reproducing device and generates read data representative thereof. A converter converts the read data generated by the reading device to converted image data which is substantially equal to the predetermined image data generated by the generating device. The converting means includes a table adapted to receive the read data as address data for converting and outputting the converted image data. The converted image data may be transmitted to the reproducing device which is arranged to reproduce an image represented by either the predetermined image data or the converted image data. The image processing apparatus of the present invention may also incorporate a digitizer having a dither processing circuit for specifically processing data in accordance with a plurality of kinds of basic cells. Each cell has a number of threshold values and is of the same shape but has different arrangements of threshold values. The plurality of kinds of basic cells are alternately arranged in two perpendicular directions and are shifted relative to one another in row and column directions of the dither matrices by a and b respec- (Abstract continued on next page.)

tively. The variables a and b represent displacements between the plural kinds of basic cells and each has a value other than zero. The dither matrix has a size N×N determined in accordance with the equation $N=m(a+b)+n(a-b)$ where M and N are minimum values of integers and satisfy the equation $M/N=(a+b)/a-b)$. In accordance with still a further feature of the present invention, the apparatus thereof may include an input device for inputting the image data as a plurality of bits. A first converter receives as an address the upper l bits of the image date in order to output converted image data and a second converter receives as an address the upper m bits of the image data in order to output converted data. Correcting means correct the converted image data by utilizing the converted data from the second converter and the lower n bits of the image data input by the input device.

19 Claims, 23 Drawing Sheets

FIG. 1-A
PRIOR ART
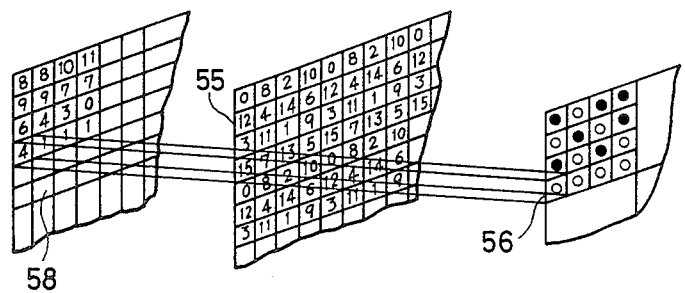
FIG. 1-B
PRIOR ART
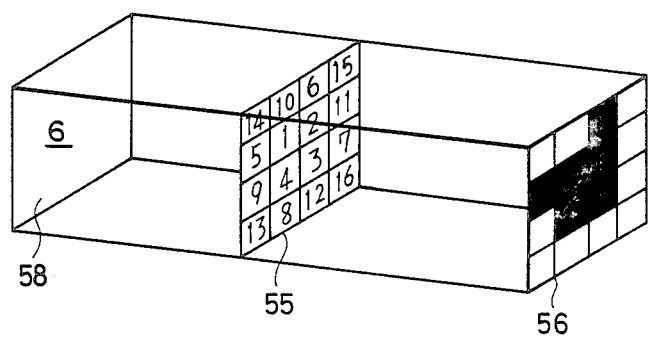

FIG. 2-A
PRIOR ART
| 48 | 36 | 20 | 52 | 50 | 38 | 22 | 54 |
|----|----|----|----|----|----|----|----|
| 16 | 0  | 4  | 40 | 18 | 2  | 6  | 42 |
| 32 | 8  | 12 | 24 | 34 | 10 | 14 | 26 |
| 60 | 28 | 44 | 56 | 62 | 30 | 46 | 58 |
| 51 | 39 | 23 | 55 | 49 | 37 | 21 | 53 |
| 19 | 3  | 7  | 43 | 17 | 1  | 5  | 41 |
| 35 | 11 | 15 | 27 | 33 | 9  | 13 | 25 |
| 63 | 31 | 47 | 59 | 61 | 29 | 45 | 57 |
FIG. 2-B
PRIOR ART
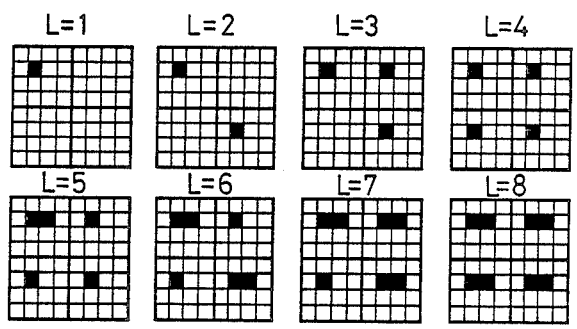

(L=3)

| D1 | | | D1' | | |
|---|---|---|---|---|---|
| Dir | Dig | Dib | Dir' | Dig' | Dib' |
| 0 | 0 | 0 | 5 | 4 | 10 |
| 0 | 0 | 20 | 4 | 6 | 26 |
| 0 | 0 | 40 | 5 | 8 | 45 |
| 0 | 0 | 60 | 4 | A | 63 |
| 0 | 0 | 80 | 4 | 10 | 76 |
| 0 | 0 | A0 | 5 | 14 | 95 |
| 0 | 0 | C0 | 5 | 18 | B0 |
| 0 | 0 | E0 | 6 | 25 | D0 |
| 0 | 20 | 0 | 18 | 28 | 15 |
| 0 | 20 | 20 | 19 | 28 | 30 |
| 0 | 20 | 40 | 17 | 29 | 50 |
| 0 | 20 | 60 | 18 | 28 | 6F |
| 0 | 20 | 80 | 17 | 29 | 75 |
| 0 | 20 | A0 | 18 | 2A | 9E |
| 0 | 20 | C0 | 18 | 2C | BB |
| 0 | 20 | E0 | 19 | 2F | D0 |
| 0 | 40 | 0 | | | |
| 0 | 40 | 20 | | | |
| 0 | 40 | 40 | | | |
| 0 | 40 | 60 | | | |
| 0 | 40 | 80 | | | |

FIG. 17-A

|    |   | 18 | 14 |    |    |
|----|---|----|----|----|----|
|    |   | 10 | 6  |    |    |
| 13 | 5 | 1  | 2  | 11 | 19 |
| 17 | 9 | 3  | 4  | 7  | 15 |
|    |   | 8  | 12 |    |    |
|    |   | 16 | 20 |    |    |

FIG. 17-B

| 8  | 12 | 18 | 14 | 13 | 5  | 1  | 2  | 11 | 19 |
|----|----|----|----|----|----|----|----|----|----|
| 16 | 20 | 10 | 6  | 17 | 9  | 3  | 4  | 7  | 15 |
| 13 | 5  | 1  | 2  | 11 | 19 | 8  | 12 | 18 | 14 |
| 17 | 9  | 3  | 4  | 7  | 15 | 16 | 20 | 10 | 6  |
| 11 | 19 | 8  | 12 | 18 | 14 | 13 | 5  | 1  | 2  |
| 7  | 15 | 16 | 20 | 10 | 6  | 17 | 9  | 3  | 4  |
| 18 | 14 | 13 | 5  | 1  | 2  | 11 | 19 | 8  | 12 |
| 10 | 6  | 17 | 9  | 3  | 4  | 7  | 15 | 16 | 20 |
| 1  | 2  | 11 | 19 | 8  | 12 | 18 | 14 | 13 | 5  |
| 3  | 4  | 7  | 15 | 16 | 20 | 10 | 6  | 17 | 9  |

FIG. 18-A
| 15 | 23 | 35 | 27 | 26 | 10 | 2  | 4  | 22 | 38 |
| 31 | 39 | 19 | 11 | 34 | 18 | 6  | 8  | 14 | 30 |
| 25 | 9  | 1  | 3  | 21 | 37 | 16 | 24 | 35 | 27 |
| 33 | 17 | 5  | 7  | 13 | 29 | 32 | 40 | 19 | 11 |
| 21 | 37 | 15 | 23 | 36 | 28 | 25 | 9  | 1  | 3  |
| 13 | 29 | 31 | 39 | 20 | 12 | 33 | 17 | 5  | 7  |
| 35 | 27 | 26 | 10 | 2  | 4  | 22 | 38 | 15 | 23 |
| 19 | 11 | 34 | 18 | 6  | 8  | 14 | 30 | 31 | 39 |
| 1  | 3  | 21 | 37 | 16 | 24 | 36 | 28 | 25 | 9  |
| 5  | 7  | 13 | 29 | 32 | 40 | 20 | 12 | 33 | 17 |
FIG. 18-B
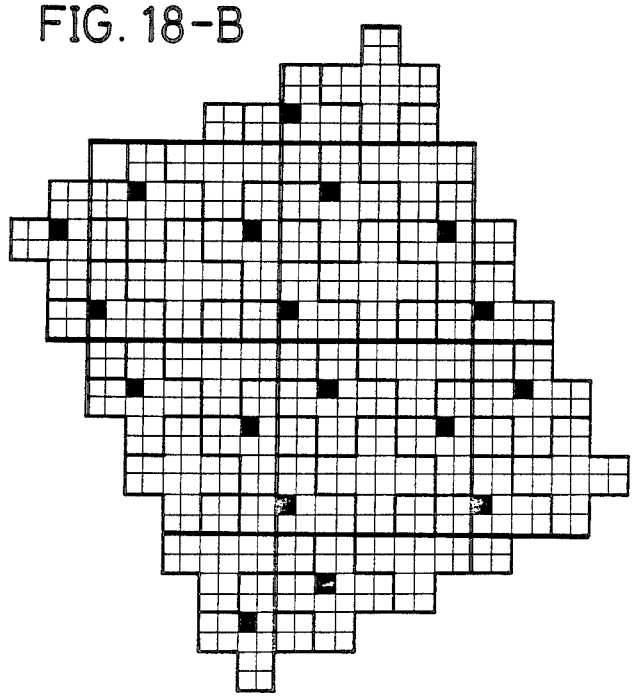

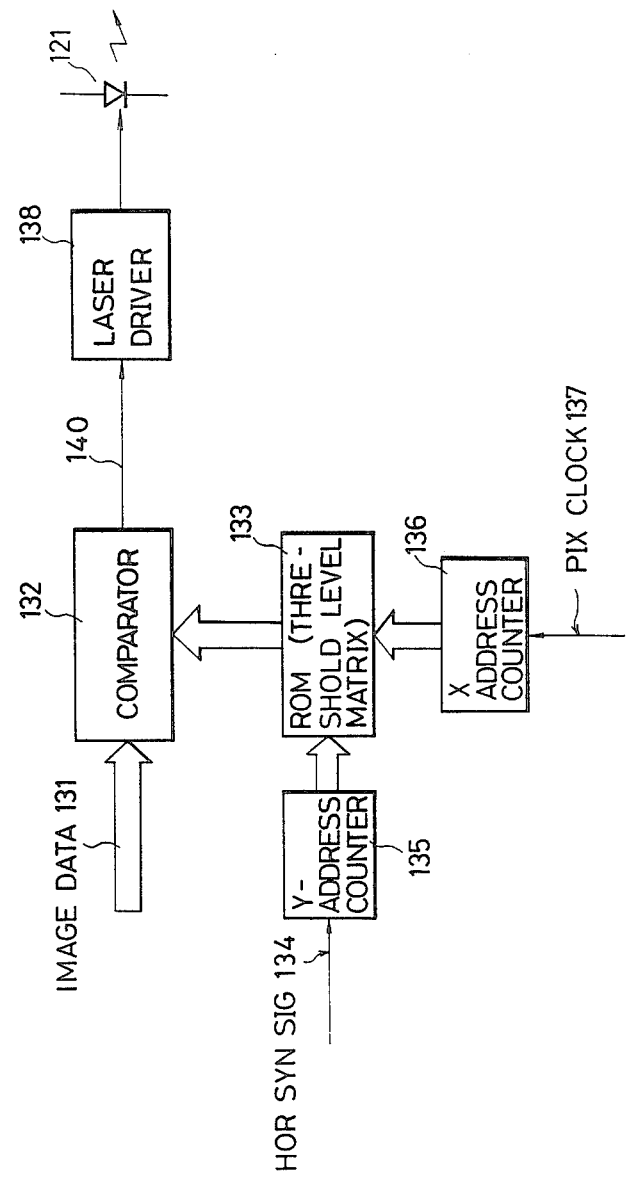

FIG. 20-A
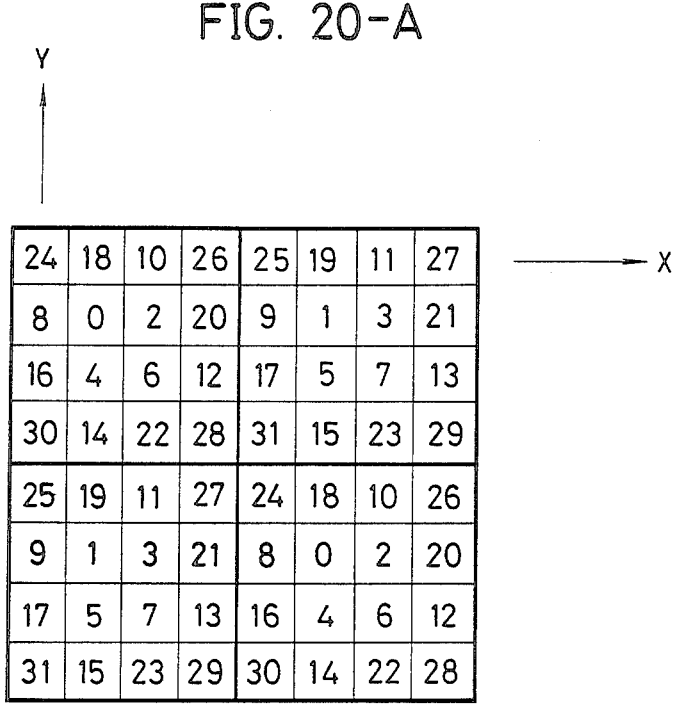
FIG. 20-B
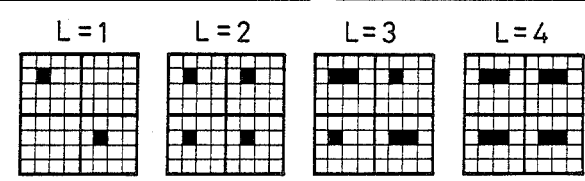
FIG. 20-C
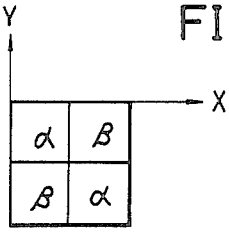

FIG. 21-A
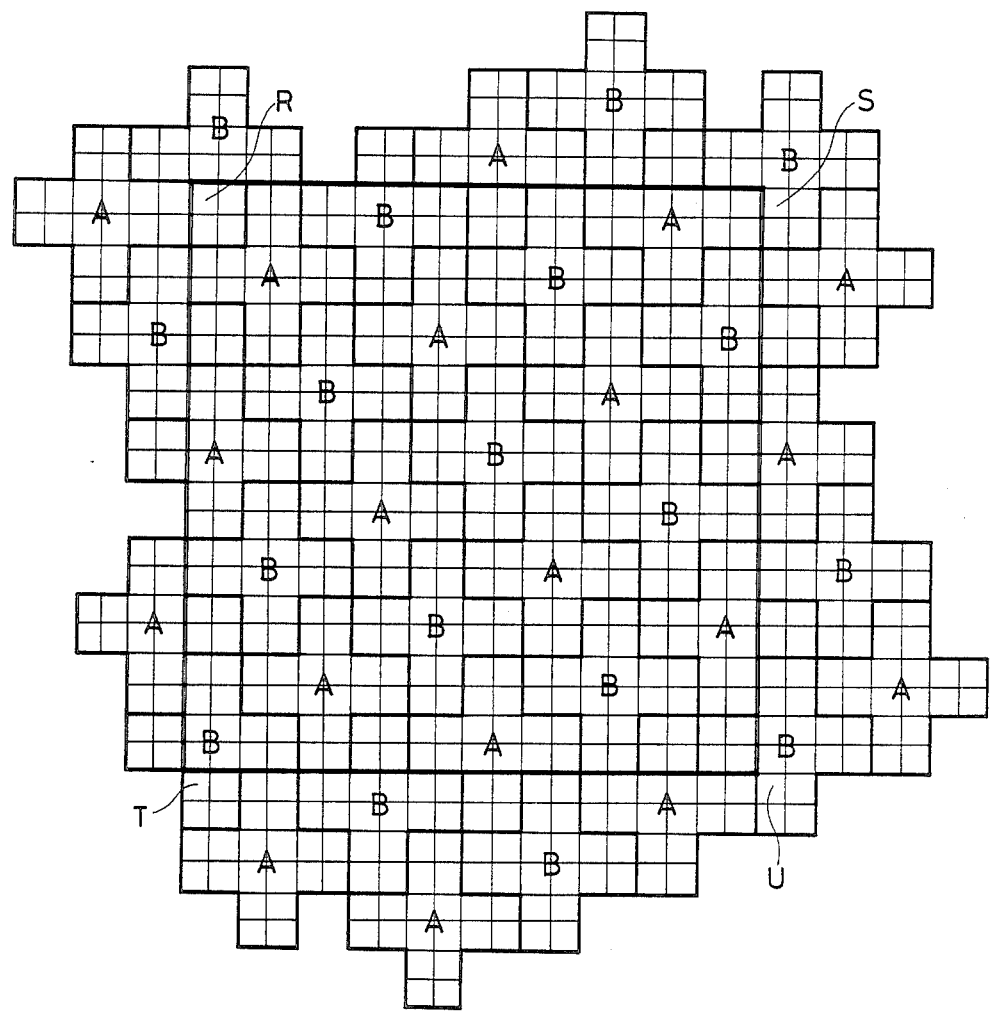

FIG. 21-B
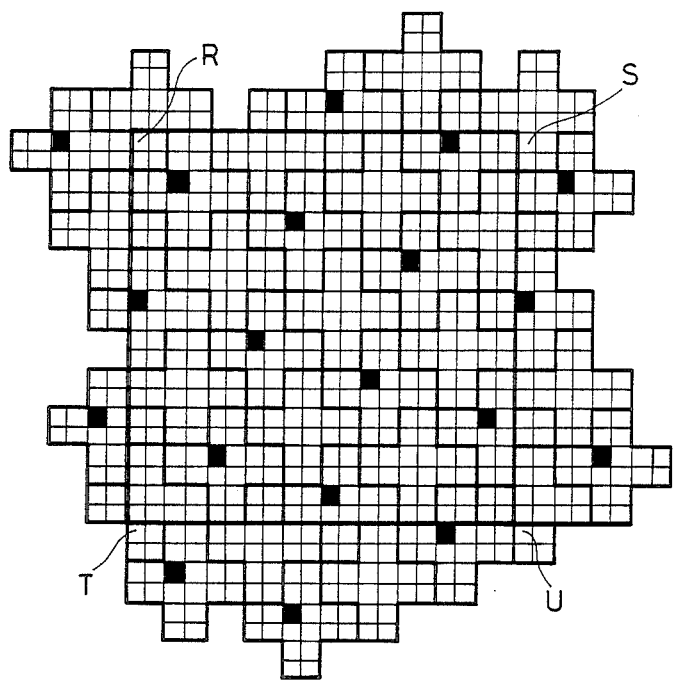
FIG. 21-C
(A)
|    |    | 34 | 26 |    |    |
|----|----|----|----|----|----|
|    |    | 18 | 10 |    |    |
| 24 | 8  | 0  | 2  | 20 | 36 |
| 32 | 16 | 4  | 6  | 12 | 28 |
|    |    | 14 | 22 |    |    |
|    |    | 30 | 38 |    |    |
(B)
|    |    | 35 | 27 |    |    |
|----|----|----|----|----|----|
|    |    | 19 | 11 |    |    |
| 25 | 9  | 1  | 3  | 21 | 37 |
| 33 | 17 | 5  | 7  | 13 | 29 |
|    |    | 15 | 23 |    |    |
|    |    | 31 | 39 |    |    |

FIG. 24-A
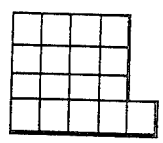
FIG. 24-B
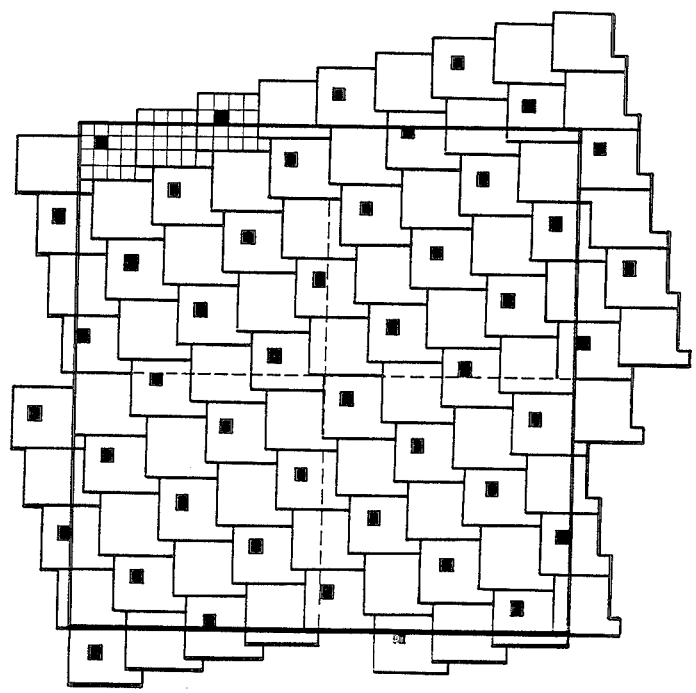

FIG. 25-A
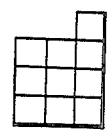
FIG. 25-B
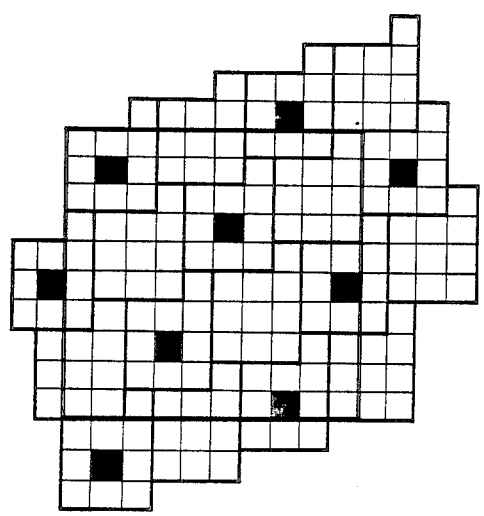

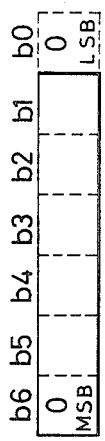
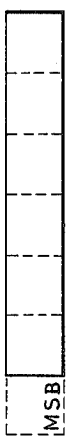
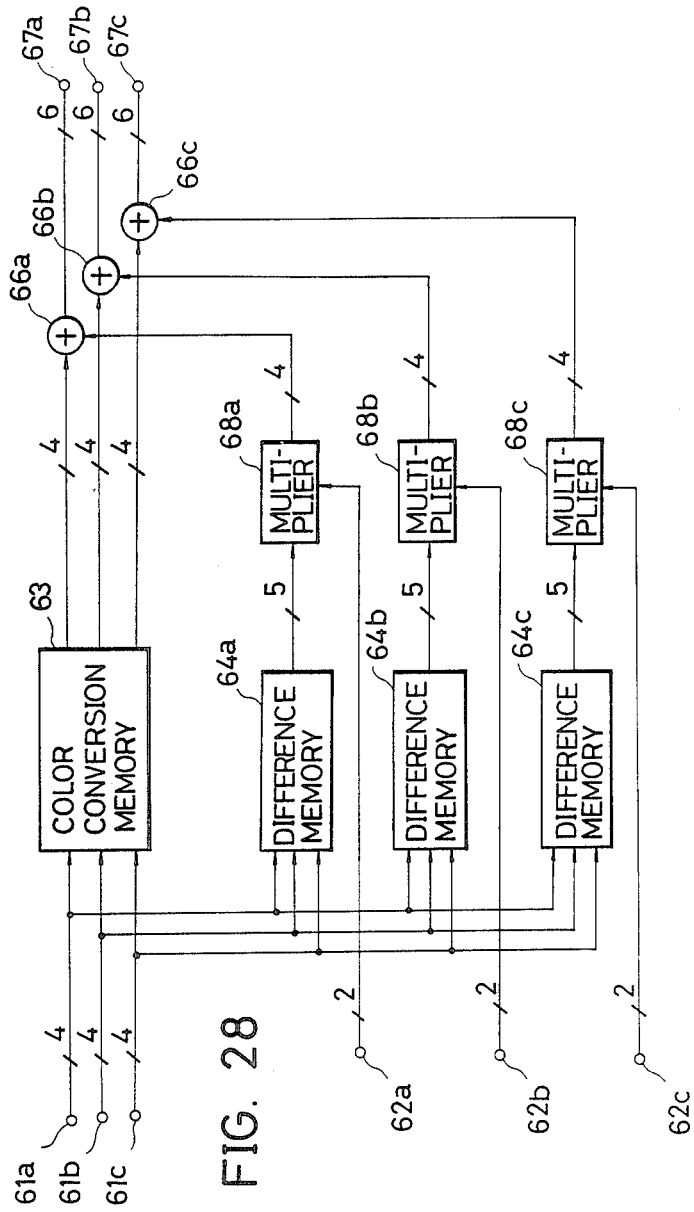
FIG. 27-A  D :
FIG. 27-B  $\frac{\Delta D}{2}$
FIG. 28

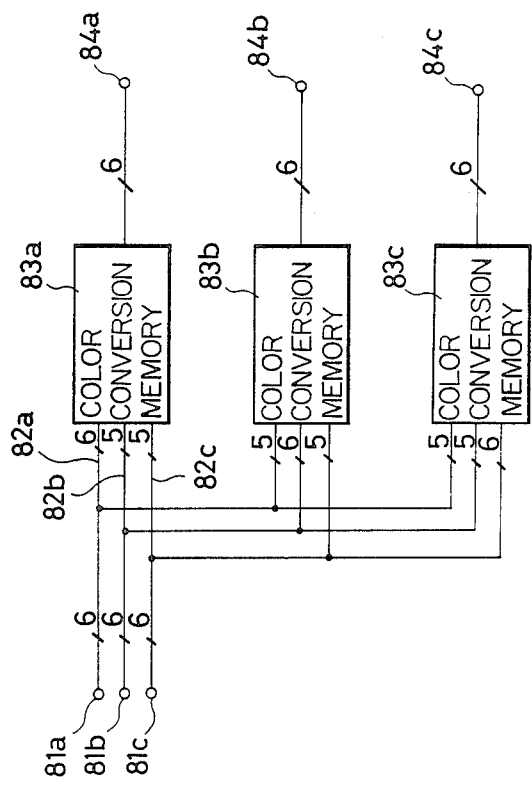

COLOR HALFTONE IMAGE PROCESSING APPARATUS PRODUCING VARIOUS SCREEN ANGLES AND HAVING AN ADAPTIVE COLOR IMAGE DATA CONVERSION LOOK-UP TABLE AND A SMALL-CAPACITY MASKING MEMORY

This application is a continuation of application Ser. No. 586,775 filed 3/6/84, now abandoned.

BACKGROUND OF THE INVENTION

1. Field of the Invention

The present invention relates to an image processing apparatus for performing conversion, correction or the like on image data.

2. Description of the Prior Art

A color image processing apparatus is known which uses a masking method for printing a color image of good quality. In this masking method, masking equations of higher order (e.g., Clapper equations) are frequently used for performing high quality color correction.

However, among such equations of higher order only equations of second or third order have been used heretofore and a satisfactory color image cannot always be reproduced. In addition to this, as it is difficult to set the coefficients for such equations it can only be performed by an experienced technician. When there is a change in the input optical system (lens system) for reading an original image, color of the illumination system, color temperature of the background of the transfer sheet, or the like, the coefficients must then be updated.

Various methods have been proposed for producing halftone images with a digital printer or the like.

The dither and density pattern methods are examples of such various methods.

These methods are widely adopted for the following reasons:

(1) A halftone image can be reproduced by a binary display device.
(2) Hardware construction of the system is simple.
(3) An image of considerably satisfactory quality can be obtained. More specifically, as shown in FIGS. 1-A and 1-B, an input pixel (input pixel information) 58 corresponds to each element of a threshold matrix 55. Whether the pixel is to be printed black or white is determined by comparing to determine if the input pixel is larger than the threshold value.

The obtained data is supplied to a display screen 56.

FIG. 1-A shows the dither method wherein an input pixel 58 corresponds to an element of the threshold matrix 55. FIG. 1-B shows the density pattern method wherein one input pixel 58 corresponds to all the elements of the threshold matrix 55. In other words, in the density pattern method, a single input pixel 58 is indicated by a plurality of cells at the display screen 56.

In this manner, the dither method and density pattern method differ from each other only in that one input pixel corresponds to one element of the threshold matrix in the former while one input pixel corresponds to all the elements of the threshold matrix in the latter. Thus, these two methods are basically the same. A method intermediate to these two methods is also conceivable. According to such a method, an input pixel corresponds to a plurality of elements (e.g., a $2 \times 2 = 4$ elements in FIG. 1-B) among all the elements of the threshold matrix.

Since these methods are basically the same, the dither method, the density pattern method and the intermediate method will inclusively be called the dither method hereinafter. In such a dither method, there are various methods of preparing a threshold matrix. Not much research has been conducted on methods of producing with ease images of high quality. However, a method of producing a halftone image with improved quality without degrading the resolution using the threshold matrix having the format as shown in FIG. 2-A is known. This threshold matrix has a format of:

1. $4 \times 4$ for resolution unit
2. $8 \times 8$ for gray level unit

FIG. 2-B shows the initial states of printing of recording dots when this threshold matrix is used. When input image data has a uniform density and an image is produced using this threshold matrix, a matrix pattern in units of 8 dots is formed when L=1 and a matrix pattern (which may also be referred to as a matrix arrangement) is formed inclined at 45° when L=2 in FIG. 2-B. However, when L=3, a uniform matrix pattern is not formed, but becomes nonuniform as shown in FIG. 3. The resultant matrix pattern is also non-uniform when L=5, 7 or the like.

When such a nonuniform (irregular) pattern (arrangement) is to be developed by electrophotography, density irregularity tends to be caused and the gray levels are disturbed when the recording dot pitch spatially changes. When such an image is printed with an ink jet printer or the like, non-uniformity of the arrangement of the recording dots becomes apparent.

Various conventional apparatuses have been proposed to perform color correction of color image data. For example, an apparatus is known which uses as an address a tricolor input digital signal from a scanner and performs color conversion and color correction in accordance with the table index method.

However, in this apparatus, the capacity of the table memory becomes extremely large, and the ratio of the cost of the memory to the total cost of the apparatus becomes prohibitively high.

FIG. 4 shows an example of a conventional apparatus of this type. Tricolor input digital data 1a, 1b and 1c from a color reader are supplied to a color conversion memory 53 as address data. Output data 7a, 7b and 7c from the memory 53 become the data after tricolor conversion. When it is assumed that the input digital signals each consist of m bits, each color signal has a combination of states of $2^m$. Therefore, the color space which can be expressed by tricolor synthesis is $2^{3m}$. It is also assumed that output data for each color consists of m bits.

When the above respects are considered, the color conversion memory 53 needs a capacity of $2^{3m}$ bits for address, and a capacity of 3m bits for output data. As a result, the total memory capacity N must be $N = 2^{3m} \times 3m$ bits.

When m is assumed to be 6, N is calculated to be 4,718,592 bits, that is, about 590 kbytes.

When m is assumed to be 8, N is calculated to be 402,653,184 bits, that is, about 50 Mbytes. Thus, the memory capacity of the color conversion memory 53 becomes extremely large, resulting in an increase in the apparatus cost.

SUMMARY OF THE INVENTION

It is an object of the present invention to eliminate the above drawbacks.

It is another object of the present invention to provide an image processing apparatus which is capable of producing an image of high quality.

It is still another object of the present invention to provide a color image processing apparatus which has excellent color reproducibility.

It is still another object of the present invention to provide a color image processing apparatus with an inexpensive arrangement which is capable of reproducing a color image of high fidelity.

It is still another object of the present invention to provide an image processing apparatus which is capable of reproducing an excellent halftone image.

It is still another object of the present invention to provide an image processing apparatus which is capable of setting a desired screen angle.

It is still another object of the present invention to provide an image processing apparatus which is capable of forming a matrix space wherein dots are printed uniformly.

It is still another object of the present invention to provide an image processing apparatus which is capable of reducing the capacity of the color conversion memory.

It is still another object of the present invention to provide an image processing apparatus with a small memory capacity which is capable of performing color processing, color correction and the like at high speed and with ease.

The above and other objects of the present invention will become apparent from the following description and appended claims when taken in conjunction with the accompanying drawings.

BRIEF DESCRIPTION OF THE DRAWINGS

FIG. 1-A is a view for explaining the dither method in a narrow sense;

FIG. 1-B is a view for explaining the density pattern method;

FIG. 2-A is a diagram showing an example of a conventional threshold matrix;

FIG. 2-B is a diagram showing the initial state of printing with recording dots in accordance with the threshold matrix shown in FIG. 2-A;

FIG. 17-A shows a basic cell;

FIG. 17-B shows a threshold matrix of one period consisting of basic cells;

FIG. 18-A is a view showing an example of a threshold matrix with improved halftone reproduction performance using the basic cells shown in FIG. 17-A;

FIG. 18-B shows an example of an image output using the threshold matrix shown in FIG. 18-A;

FIG. 19 is a block diagram for explaining a dither processing circuit;

FIG. 20-A shows an example of a threshold matrix used in the embodiment of the present invention;

FIG. 20-B shows the image output states of the threshold matrix shown in FIG. 20-A;

FIG. 20-C shows the arrangement directions of the basic cells;

FIG. 21-A shows an example of a threshold matrix having a screen angle;

FIG. 21-B shows an image output state of the threshold matrix shown in FIG. 21-A;

FIG. 21-C shows basic cells having different thresholds;

FIG. 24-A shows an example of a basic cell;

FIG. 24-B shows a threshold matrix consisting of basic cells shown in FIG. 24-A;

FIG. 25-A is an example of a basic cell;

FIG. 25-B shows a threshold matrix consisting of basic cells shown in FIG. 25-A;

FIGS. 27A and 27B are views for explaining the addition method; and

FIGS. 28, 29 and 30 are block diagrams showing another embodiment of the present invention.

DETAILED DESCRIPTION OF THE PREFERRED EMBODIMENTS

The preferred embodiment of the present invention will be described below with reference to the accompanying drawings.

Figure 3:
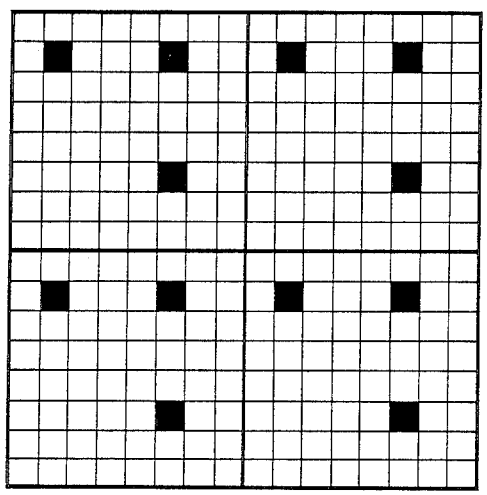
FIG. 3 is a diagram showing an example of an image output in accordance with the threshold matrix shown in FIG. 2-A.
Figure 4:
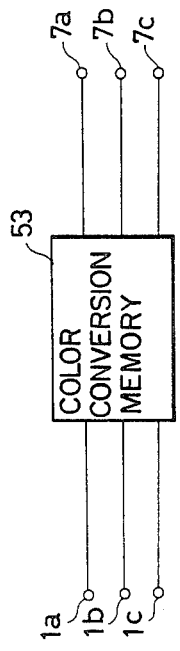
FIG. 4 is a block diagram showing an example of a conventional color conversion/correction apparatus.
Figure 5:
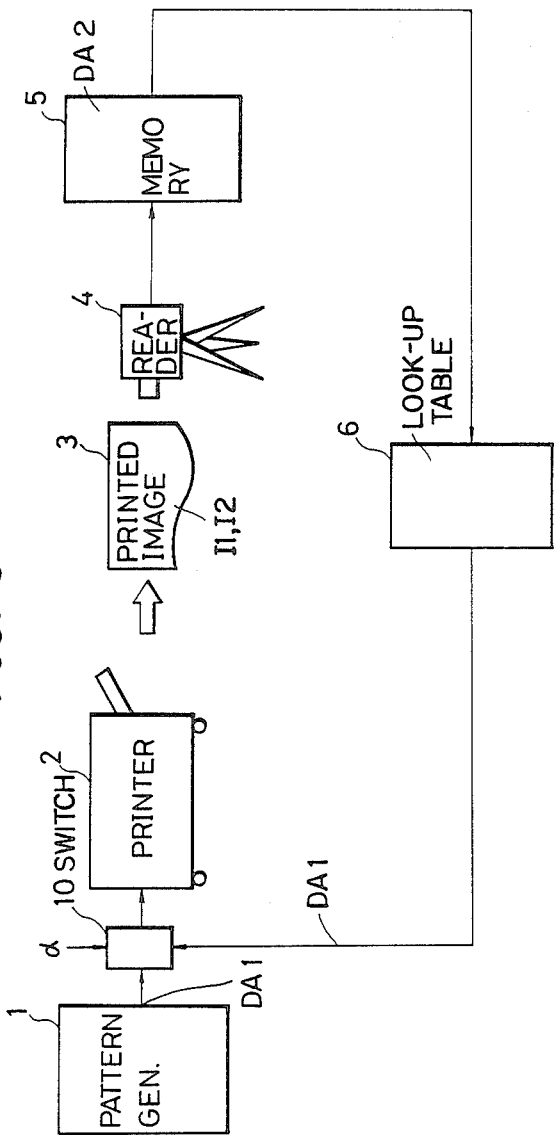
FIG. 5 is a block diagram showing the schematic configuration of a color image processing apparatus according to an embodiment of the present invention.

FIG. 5 shows the schematic configuration of a color image processing apparatus according to an embodiment of the present invention. Referring to FIG. 5, a pattern generator 1 generates image data of predetermined colors and density to a printer 2.

Figure 11:
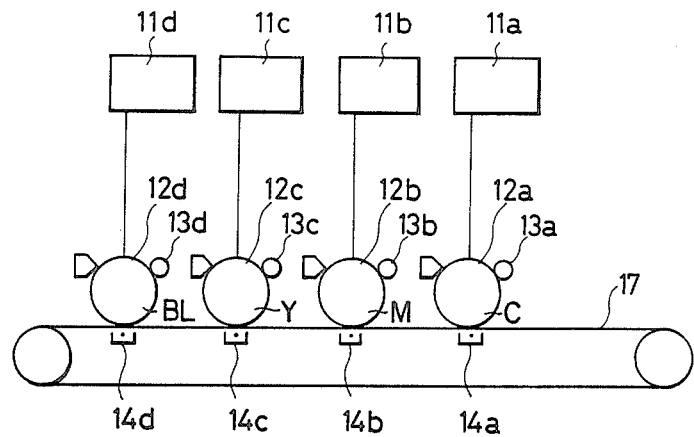
FIG. 11 is a schematic view showing the arrangement of a color image recorder as an example of a printer.

The printer 2 has a configuration as shown, for example, in FIG. 11. The printer 2 visually produces the image data from the pattern generator 1 and forms an image on a transfer sheet 3. A reader 4 reads a color image formed on the transfer sheet 3 and generates an image signal. A memory 5 receives and stores the image signal from the reader 4. The memory 5 stores a look-up table (LUT) 6 for converting the image data. A switch 10 switches the LUT 6 or the pattern generator 1 to the printer 2 in accordance with an external signal α (from a switch depressed by an operator). The mode of operation of the apparatus will now be described. When image data DA1 of predetermined color and density is produced from the pattern generator 1, the printer 2 prints an image I1 corresponding to this image data $\mathbb{D}$A1 on a transfer sheet 3. The image I1 on the transfer sheet is read by the reader 4, and the image data is stored in the memory 5. Then, in general, image data $\mathbb{D}$A2 in the memory 5 and the original image data $\mathbb{D}$A1 from the pattern generator 1 have different values in accordance with the characteristics of the apparatus, or the like.

Accordingly, when the image data $\mathbb{D}$A2 in the memory 5 is supplied to the printer 2, an image I2 is formed having different color and density from those of the image I1 formed by the printer 2.

In view of this, the image data $\mathbb{D}$A2 in the memory 5 is converted into the original image data $\mathbb{D}$A1 by the LUT and is supplied to the printer 2 in accordance with the switching operation of the switch 10. Then, the printer 2 can print the image I1. In this embodiment, the LUT is used as a means for converting the image data $\mathbb{D}$A2 in the memory 5 to the original image data $\mathbb{D}$A1. This LUT is a table (memory) which uses the image data $\mathbb{D}$A2 as an address and which produces the image data $\mathbb{D}$A1.

In this manner, when an LUT is used, the original image read by a reader can be reproduced with good fidelity.

Figure 6:
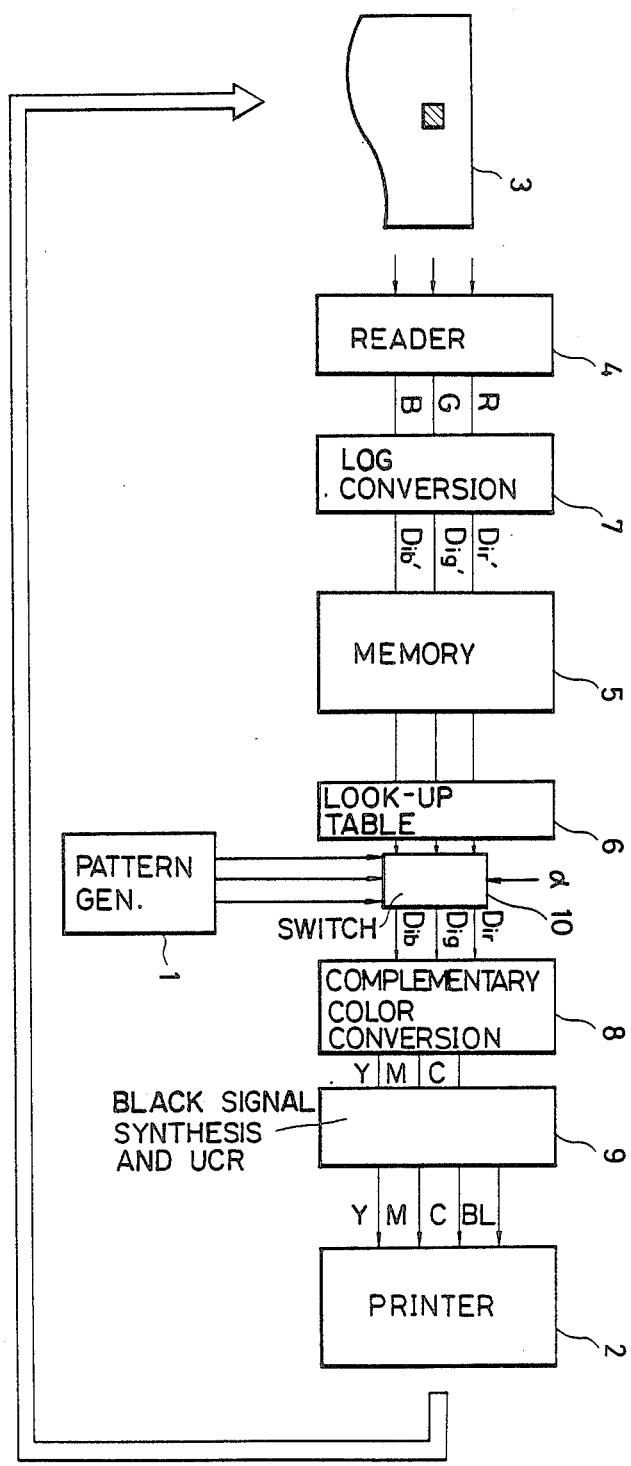
FIG. 6 is a detailed block diagram showing the configuration of the color image processing apparatus shown in FIG. 5.

FIG. 6 is a detailed block diagram of the apparatus shown in FIG. 5. The LUT will now be described in more detail with reference to FIG. 6.

The same reference numerals as in FIG. 5 denote the same parts in FIG. 6, and a detailed description thereof will be omitted.

The image data from the pattern generator 1 corresponds to density data of a certain color and this value is assumed to be given by:

$$\mathbb{D}i = (Dir, Dig, Dib)$$

Such data is converted by a complementary color conversion circuit 8 into yellow (Y), magenta (M), and cyan (C) density data. Thereafter, black signal synthesis processing, undercolor removal and the like are performed by a black signal synthesis and UCR circuit 9. An image is thus printed.

In general printing operation, for example, 64 density levels can be produced. Accordingly, the number of combinations of image data to be supplied from the pattern generator 1 to the printer 2 is calculated to be:

$$N = 64^3 = 262,144$$

Figures 7, 8:
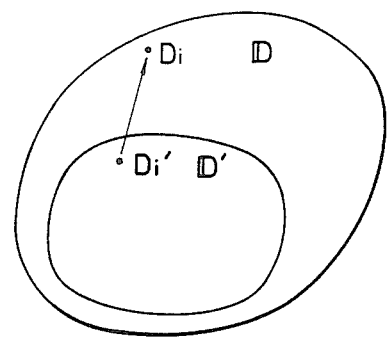
FIG. 7 is a diagram for explaining the color reproduction region.
FIG. 8 is a table showing image data D1 generated from a pattern generator together with image data D1' from a reader.

When it is assumed that all these data can be printed by the printer 2 and the range of the color reproduction of the printed image is represented by a set D in FIG. 7, this set D is a color reproduction region of the printer 2.

When the printed image is read by the reader 4 and is subjected to a log density conversion by a known log conversion circuit 7, image data Di' give below:

$$\mathbb{D}i' = (Dir', Dig', Dib')$$

is stored in the memory 5.

A set $\mathbb{D}'$ shown in FIG. 7 represents a color reproduction region wherein the image data stored in the memory 5 is printed without processing by the LUT. As may be apparent from FIGS. 6 and 7, when the image data is read through the reader 4, the range of image data which can be produced is narrowed due to the characteristics of the reader or the like. This results in a narrowing of the color reproduction region (color reproducibility).

Accordingly, in this embodiment, the image data stored in the memory 5 is converted by the LUT so as to expand the set $\mathbb{D}'$ to the set $\mathbb{D}$. In this manner, by expanding the range of image data which can be reproduced, excellent image reproduction can thus be performed.

The method of preparing the LUT will now be described.

As described above, in a system wherein a predetermined image data $\mathbb{D}$A1 is produced from the pattern generator 1, printing is performed for this data, and the printed image is read by the reader 4, the LUT converts the read image data $\mathbb{D}$A2 into the original image data $\mathbb{D}$A1 using the data $\mathbb{D}$A2 as the address. Accordingly, when the data is to be stored in all the addresses of the LUT, image data of all the combinations must be produced from the pattern generator 1 and must be written in the LUT.

Accordingly, if all the data of $64^3$ combinations are to be written in the LUT, the amount of data is too large and data writing cannot be easily performed.

As a countermeasure against this, the image data from the pattern generator 1 is sampled, and this sampled image data is written in the LUT. The image data to be written in addresses of the LUT can be obtained by interpolation without the need for writing therein. Then, data can be written at all the addresses of the LUT with ease.

When the number of density levels of the respective colors from the pattern generator is decreased to 8 levels, only data writing for $N = 8^3 = 512$ image data need to be performed.

In FIG. 8, $\mathbb{D}1'$ is image data obtained when the image data shown at $\mathbb{D}1$ is printed and the printed image is read by the reader 4. Thus, as described above, the LUT is prepared by using the image data shown at column D1' in FIG. 8 as addresses and writing the image data shown at column $\mathbb{D}1$ in FIG. 8 at these addresses. $\mathbb{D}1r$, $\mathbb{D}1r'$, $\mathbb{D}1g$, $\mathbb{D}1g'$, $\mathbb{D}1b$, and $\mathbb{D}1b'$ are respectively density data of red, green and blue.

In this embodiment, as may be seen from column $\mathbb{D}1$ in FIG. 8, image data from the pattern generator is sampled at large sampling intervals. Such sampling can enlarge the color reproduction region of each color.

Figure 9:
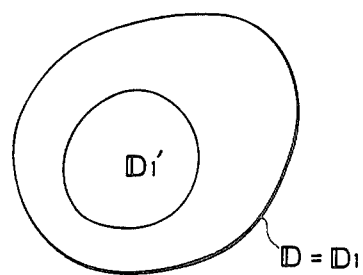
FIG. 9 is a diagram showing the color reproduction region when the image data shown in FIG. 8 is used.

Referring to FIG. 9, a set $\mathbb{D}$ represents a maximum color reproduction region of a color which can be produced by the printer 2, as in the case shown in FIG. 7.

As may be seen from FIGS. 8 and 9, in this embodiment, since the image data from the pattern generator are sampled at large intervals, the color reproduction region represented by column $\mathbb{D}1$ is that represented by the set $\mathbb{D}$ and the color reproduction region is not narrowed.

The sampling method of the image data from the pattern generator 1 will now be described with reference to FIG. 10. When the LUT is used, the image data T' from the reader is used as addresses, and data $\mathbb{D}$T stored at such addresses are image data to be supplied to the printer 2. However, with the LUT, single image data must be obtained for each address thereof. In order to satisfy this requirement, an inverse conversion equation is obtained from a conversion equation from T→ $\mathbb{D}$T' in the LUT.

$$\mathbb{D}T = f(\mathbb{D}T) \tag{1}$$

the inverse conversion equation:

$$DT = f^{-1}(DT') \quad (2)$$

must be a one-valued function for $DT'$. In order to satisfy this requirement, $DT'$ in equation (1) must be a monotonously increasing or decreasing function and must not have poles.

Accordingly, the following relation must be satisfied:

$$\partial f/\partial DT \neq 0 (0 < DT < DT\text{max}) \quad (3)$$

However, when the sampling interval between sampled image data is too small, an error $\Delta$ is included in the image data $T'$ due to the influence of the characteristics of the reader or the like and the condition of equation (3) above cannot be satisfied. In other words, when the LUT is prepared, two or more data $DT$ can be obtained for a single address $DT'$.

In view of this, setting is performed such that equation (1) becomes a monotonously increasing function, and the relationship between the error $\Delta$ and the sampling interval in accordance with the characteristics of the apparatus or the like can be determined.

Figure 10:
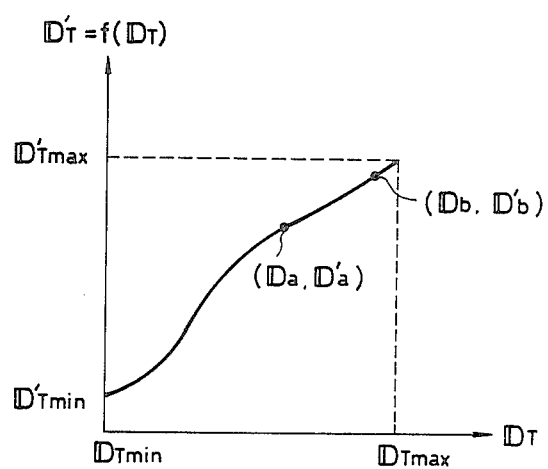
FIG. 10 is a graph showing the conversion characteristics of D1 to D1' in an LUT (look-up table)

When it is assumed that DT' has an error of $DT' \pm \Delta$ from FIG. 10, we have from equation (3), $$(Db' - Da' \pm 2\Delta)/(Db - Da) > 0$$

Therefore, $$Db' - Da' > 2\Delta \quad (4)$$

where Da and Db are sampled image data from the pattern generator 1, and $Da'$ and $Db'$ are values of the printed image which are read by the reader.

Thus, the sampling interval must be greater than a predetermined value as seen from equation (4) above.

The interpolation of data for other addresses of the LUT can be performed with a B-spline function or the like. Thus, continuous image data writing can be performed.

FIG. 11 is a schematic view for explaining a color recording apparatus as an example of the printer 2. The color image recording apparatus shown in FIG. 11 comprises an electrophotographic copying machine (laser beam printer) which includes a plurality of photosensitive drums which are arranged next to each other. Images formed by the electrophotographic copying machine are sequentially printed on a transfer sheet in different colors to record a color image.

Scanning optical systems 11a to 11d scan image information from an image memory or the like (not shown) in the form of light beams (laser beams). The laser beams are focused on photosensitive drums 12a to 12d which are arranged in correspondence with cyan (C), magenta (M), yellow (Y) and black (BL). Developers 13a to 13d are arranged near the photosensitive drums 12a to 12d. Chargers 14a to 14d are also arranged to oppose the photosensitive drums 12a to 12d at the side of a conveyor belt 17 for conveying a recording sheet (not shown). The mode of operation of this apparatus will now be described. The laser beams from the scanning optical systems 11a to 11d form images on the photosensitive drums 12a to 12d. Thereafter, the images formed by the electrophotographic process become electrostatic latent images which are developed by the developers 13a to 13d. The images of the respective colors are then transferred onto the recording sheet on the conveyor belt 17 by the chargers 14a to 14d, thereby forming a color image.

Figure 12:
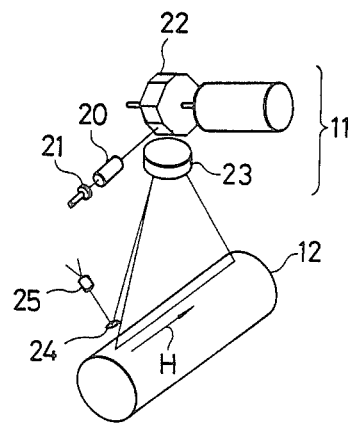
FIG. 12 is a perspective view of a scanning optical system.

FIG. 12 is a schematic perspective view showing the details of one system among the scanning optical systems 11a to 11d. The laser beam modulated by a semiconductor laser 21 is collimated by a collimator lens 20, and is deflected by a rotary polygonal mirror 22. The polarized laser beam forms an image on a photosensitive drum 12 through an imaging lens 23 called an $f-\theta$ lens, thereby performing beam scanning. In this beam scanning, the leading end of one scanning line of the laser beam is reflected by a mirror 24 and the reflected light is guided to a detector 25. The detection signal from the detector 25 is used as a sync signal in the horizontal direction H. This signal will be referred to as a signal BD or a horizontal sync signal hereinafter.

Figure 13:
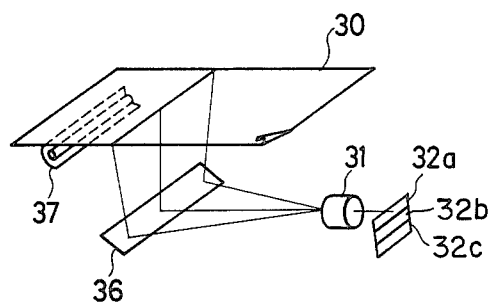
FIG. 13 is a schematic view of a reader.

FIG. 13 shows an example of the reader 4. Referring to FIG. 13, a color original 30 is illuminated with light from a light source 37. Reflected light from the color original 30 is supplied to CCD line sensors 32a to 32c through a mirror 36 and a lens 31. Therefore, the image of the color original 30 is formed on the CCD line sensors 32a to 32c and is read with high resolution.

Figure 14:
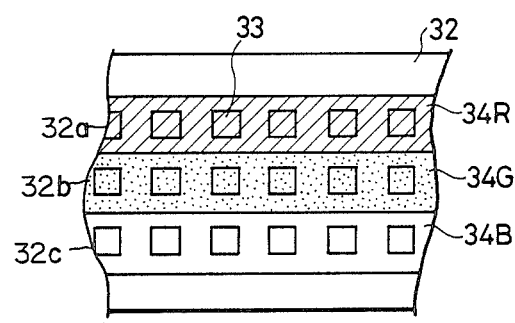
FIG. 14 is a schematic view of a CCD line sensor.

The CCD line sensors 32a to 32c comprise three arrays of light-receiving sections 33 each of 2048 bits as shown in FIG. 14. The respective light-receiving sections have stripe filters 34B, 34G and 34R of blue (B), green (G), and red (R) colors, respectively. Pixel data produced from the reader 4 having the construction as shown in FIG. 13 is obtained by simultaneous color separation of the image information at a single point of the original.

Figure 15:
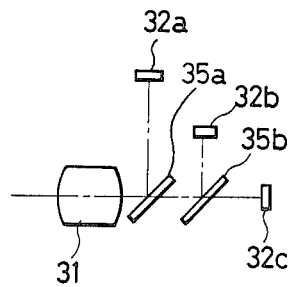
FIG. 15 is a view showing another example of a reader.

FIG. 15 shows an another example of the reader 4 of the present invention. Tricolor separation dichroic filters 35a and 35b are arranged immediately behind the lens 31. The images of the respective colors are supplied to the line sensors 32a, 32b, and 32c. The reader as shown in FIG. 15 can also time-serially produce the tricolor separated image data at a single point on the original.

The respective signals of red (R), green (G) and blue (B) obtained in this manner are supplied to the log conversion circuit 7 shown in FIG. 6, as luminance signals (signals which are linear relative to the reflectivities of the corresponding colors).

Figure 16:
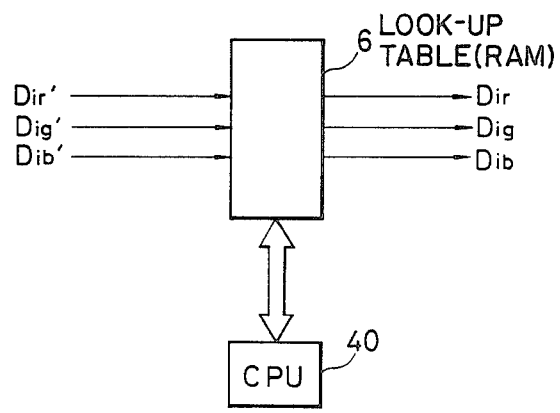
FIG. 16 shows an LUT (look-up table) connected to a CPU.

The LUT 6 preferably comprises a RAM. This is because when the LUT 6 comprises a RAM, the data stored in the LUT 6 can be updated when there is a change in the reader 4, the color of the transfer sheets or the like. Updating of the data in the LUT 6 can be performed under the control of a CPU 40 as shown in FIG. 16. When a different reader is used, for example, the operator supplies a corresponding instruction to the CPU 40 by means of a keyboard, and then the data in the LUT 6 can be changed accordingly. In the embodiment described above, the LUT 6 is interposed between the memory 5 and the complementary color conversion circuit 8. However, the LUT 6 may be arranged at another position such as a position between the reader 4 and the log conversion circuit 7.

The printer is used in the above embodiment. However, another type of recording apparatus such as a CRT may be used.

The pattern generator may be replaced with a computer which is capable of producing predetermined image data.

In summary, according to the present invention, color image reproduction can be performed with high fidelity by an apparatus of simple construction. Even if a different reader is used, the data in the LUT need only be updated by the method described above to allow color image reproduction to continue.

A second embodiment of the present invention will now be described. In this embodiment, a dither processing circuit is inserted between a black signal synthesis and UCR circuit 9 and a printer 2. A color image recording apparatus according to the present invention has been described with reference to FIGS. 11 and 12, and will therefore not be repeated.

A threshold matrix (dither matrix) in this embodiment has different screen angles for the respective colors in order to prevent generation of moiré patterns which are generated by color synthesis. For example, the screen angles are changed with respect to the horizontal scanning direction of the image; 0° for the magenta image, 15° for the yellow image, 30° for the cyan image, and 60° for the black image; or 15° for the magenta image, 30° for the cyan image, 60° for the yellow image, and 90° for the black image.

FIG. 17-A shows a basic cell of the threshold matrix for changing the screen angles. FIG. 17-B shows a basic threshold matrix. Note that the basic cell signifies a unit pattern when the thresholds are repeatedly arranged. Regarding such basic threshold matrix, when 10×10 basic threshold matrices are repeatedly arranged, for example, the shape of the basic cell is not disturbed and the same threshold value occurs for each of the corresponding 10 vertical or horizontal values. The threshold matrix shown in FIG. 17-B consists of 10×10 threshold values. Since the basic cell consists of 20 threshold values, up to 20 gray levels can be obtained (i.e., 21 gray levels including white).

FIG. 18-A shows an example of a threshold matrix when the gradation expression is improved using the basic cell shown in FIG. 17-A. The threshold matrix shown in FIG. 18-A has two types of basic cells having different threshold values so as to improve the gradation expression without degrading resolution. FIG. 18-B shows a pattern of recording dots when input image data has uniform density such as image data "1". As may be seen from FIG. 18-B, the pattern (arrangement) of the recording dots is not uniform.

FIG. 19 shows a dither processing circuit according to this embodiment. Input image data (input pixel data) 131 is a digital signal of, for example, 8 bits and is supplied to a comparator 132. The input signal data 131 is compared with an output from a threshold matrix ROM 133 by the comparator 132. The threshold matrix ROM 133 stores a threshold matrix and produces one threshold matrix element upon being addressed by an X address counter 136 and a Y address counter 135. The threshold matrix data also consists of 8 bits. When the threshold matrix data is represented by Txy (where x and y are addresses of the matrix) and image data 131 is represented by I, the comparator 132 produces a signal "1" when I≧Txy and a signal "0" when I<Txy. An output 140 ("0" or "1") from the comparator 132 is supplied to a laser driver 138 so as to turn on/off (modulate) the semiconductor laser 121. The x and y addresses of the threshold matrix are generated from a pixel clock 137 and a horizontal sync signal 134, respectively. The pixel clock 137 is generated by an oscillator (not shown), and the horizontal sync signal 134 has been described earlier. The elements of the threshold matrix are selected one by one by the pixel clock 137 and the horizontal sync signal 134 and are supplied to the comparator 132 as threshold data.

FIG. 20-A shows an example of the threshold matrix stored in the threshold matrix ROM 133, which comprises an 8×8 threshold matrix consisting of four 4×4 basic cells. The directions of arrangement of the basic cells shown in FIG. 20-A can be regarded as x- and y-directions as shown in FIG. 20-C. When basic cells α and β having different threshold values are arranged alternately along the directions of arrangement (x- and y-directions), as shown in FIG. 20-C, a uniform recording dot pattern can be obtained as shown in FIG. 20-B. Although the gradation expression is degraded with reference to that obtained when the threshold matrix shown in FIG. 2-A is used, a uniform matrix pattern can be obtained.

FIG. 21-A shows an example of a threshold matrix having screen angles. Basic cells (A) and (B) having different threshold values are used, as shown in FIG. 21-C. In the basic cells (A) and (B) of this embodiment, the threshold values of the corresponding elements differ by one. The overall threshold matrix comprises a 20×20 square matrix as indicated by the thick solid line in FIG. 21-A and two types of basic cells (A) and (B) are arranged therein. FIG. 21-B shows a recording dot pattern when input image data is uniform ("0") in the 20×20 threshold matrix. As may be seen from a comparison with that shown in FIG. 18-B, the recording dots form a uniform recording pattern as shown in FIG. 21-B.

The method of preparing a threshold matrix for forming a uniform recording dot pattern and having screen angles will now be described.

Figure 22:
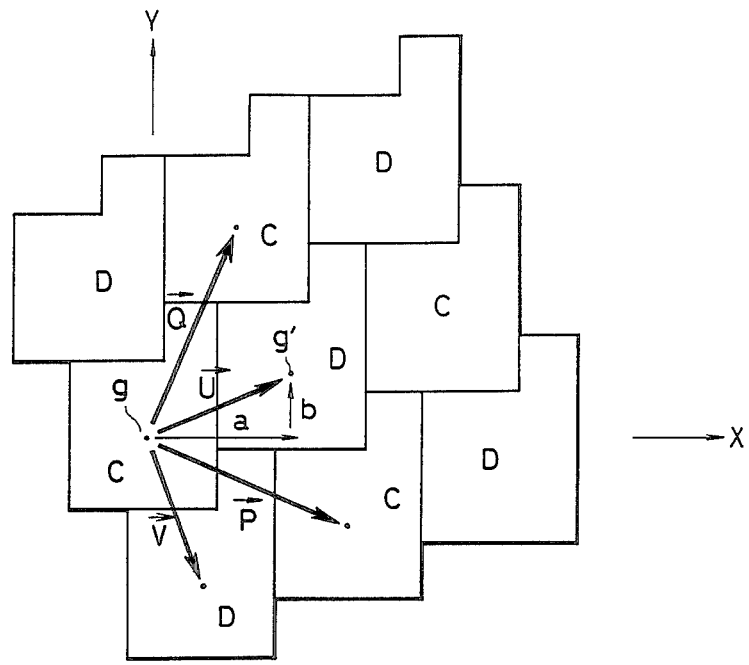
FIG. 22 is for explaining the arrangement directions of basic cells.
Figure 23:
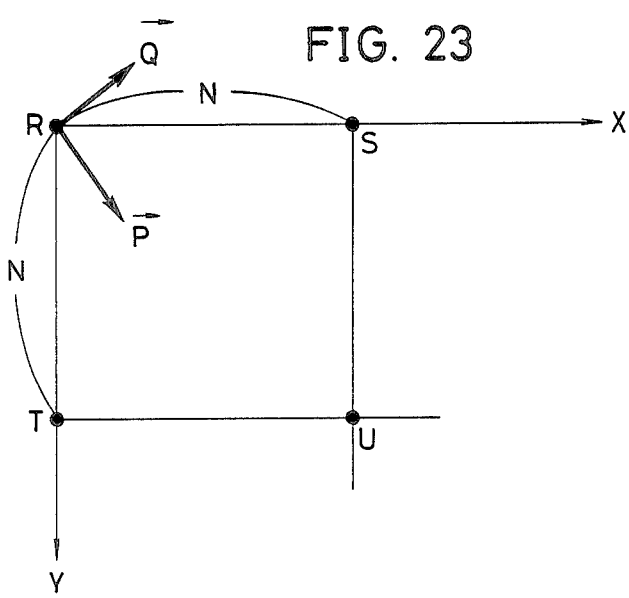
FIG. 23 is a view for explaining an $N \times N$ square threshold matrix.

It is assumed that in order to provide screen angles, basic cells C and D are shifted by a in the x-direction and b in the y-direction, as shown in FIG. 22. In FIG. 22, g and g' represent the corresponding positions of the basic cells. The shape of the basic cell is not particularly limited if the basic cells can be arranged next to each other. The basic cell arrangement is given by two basic vectors $\vec{u}$ and $\vec{v}$ as follows:

$$\vec{u}=(a, b)$$

$$\vec{v}=(b, -a) \text{ for } (a>b) \quad (1)$$

It is determined that $\vec{u} \perp \vec{v}$ (vectors $\vec{u}$ and $\vec{v}$ are orthogonal) from $\vec{u}\cdot\vec{v}=ab-ba=0$. At this time, the directions of the vectors $\vec{u}$ and $\vec{v}$ are the directions of arrangement of the basic cells. When the basic cells C and D having different threshold values are arranged alternately along the directions of the arrangement, the arrangement as shown in FIG. 22 is obtained. Two basic vectors $\vec{P}$ and $\vec{Q}$ constituting the basic cell C are given by:

$$\vec{P}=\vec{u}+\vec{v}=(a+b, b-a)$$

$$\vec{Q}=\vec{u}-\vec{v}=(a-b, a+b) \quad (2)$$

We have $\vec{P} \perp \vec{Q}$ from $\vec{P}\cdot\vec{Q}=0$. In order to obtain a uniform matrix pattern, point R at the corner of the N×N square threshold matrix and points S, T and U advanced by N in the x- and y-directions therefrom define one period and have the same threshold values. This is shown in FIG. 21-A. That is, N is obtained from minimum values of m and n satisfying the equation:

$$mod(m\vec{P}+n\vec{Q}, N)=\vec{O}$$

where $O=(0, 0)$, m and n are integers corresponding to the size of the threshold matrix needed to obtain a uniform recording dot pattern, and mod (P, Q) signifies the remainder when P is divided by Q. When it is assumed that the threshold matrix is constituted such that points R and S along the x-direction define one period, then points T and U also define one period. Thus, in order that points R and S define one period, the following relations:

$$m\vec{P}+n\vec{Q}=\vec{S} \text{ for } \vec{S}=(N, O) \quad (3)$$

must be satisfied. Substitution of relation (3) in relation (2) above yields:

$$m(\vec{u}+\vec{v})+n(\vec{u}-\vec{v})=S$$

$$m(a+b, b-a)+n(a-b, a+b)=(N, O)$$

$$\begin{cases} m(a+b)+n(a-b)=N & (4a) \\ m(b-a)+n(a+b)=O & (4b) \end{cases}$$

From equation (4b), minimum integers m and n which satisfy:

$$m/n=(a+b)/(a-b) \quad (5)$$

are calculated. The size N of the threshold matrix can be determined from equation (4a) using these integers m and n. These equations and relations will now be applied to the threshold matrix shown in FIG. 21-A. In FIG. 21-A, since a=4 and b=2, from equation (5):

$$m/n=(4+2)/(4-2)=6/2=3/1$$

The minimum values (m, n) which satisfy this are (3, 1). Next, from equation (4a), N is determined as follows:

$$N=3\times(4+2)+1\times(4-2)=18+2=20$$

Thus, a 20×20 threshold matrix is determined to be the matrix size which allows formation of a uniform recording dot pattern in this case.

FIG. 24-B shows a threshold matrix prepared using basic cells having the shape shown in FIG. 24-A. As described above, the basic cells shown in FIG. 24-A comprise cells having different threshold values. When it is assumed that a=4 and b=1, from equation (5) above, we have:

$$m/n=(4+1)/(4-1)=5/3$$

$$(m, n)=(5, 3)$$

Accordingly, from equation (4a), the size N can be determined thus:

$$N=5\times(4+1)+3\times(4-1)=34$$

Accordingly, a uniform recording dot pattern can be obtained when a 34×34 threshold matrix is used in this case.

FIG. 25-B shows a threshold matrix obtained using basic cells having the shape shown in FIG. 25-A. When it is assumed that a=3 and b=1, from equation (5), we can calculate:

$$m/n=(3+1)/(3-1)=4/2=2/1$$

$$(m, n)=(2, 1)$$

Accordingly, from equation (4a), the size N can be determined thus:

$$N=2\times(3+1)+1\times(3-1)=10$$

Therefore a 10×10 threshold matrix as shown in FIG. 25-B can be used to obtain a uniform recording dot pattern.

In the cases shown in FIGS. 24-B and 25-B, the basic cells having different threshold values and shapes as shown in FIGS. 24-A and 25-A are alternately arranged. Table 1 below shows values of m, n and N for different values of a and b. The angle $\theta$ (deg) represents a screen angle and can be calculated by $\theta=\tan^{-1}(b/a)$.

TABLE 1

| a | b | m | n | N | $\theta$ (deg) |
|---|---|---|---|---|---|
| 3 | 1 | 2 | 1 | 10 | 18.4° |
| 3 | 2 | 5 | 1 | 26 | 33.7° |
| 4 | 1 | 5 | 3 | 34 | 14.0° |
| 4 | 2 | 3 | 1 | 20 | 26.6° |
| 4 | 3 | 7 | 1 | 50 | 36.9° |
| 5 | 1 | 3 | 2 | 26 | 11.3° |
| 5 | 2 | 7 | 3 | 58 | 21.8° |
| 5 | 3 | 4 | 1 | 34 | 31.0° |
| 5 | 4 | 9 | 1 | 82 | 38.7° |

In the embodiment described above, dither conversion is performed by a circuit as shown in FIG. 19. However, dither conversion (dither processing) can be performed by another circuit. For example, a dither processing circuit can be used wherein input image data itself is used as addresses, the memory (e.g., a RAM) is accessed in accordance with these addresses, and binary signals are thus obtained.

In the embodiment described above, since two types of basic cells are used for a threshold matrix, the gradation expression is improved. Furthermore, as these two types of basic cells are alternately arranged along the two orthogonal directions (i.e., directions of arrangement), the size of the threshold matrix N×N can be calculated from $N=m(a+b)+n(a-b)$ where m and n are minimum integers satisfying $m/n=(a+b)/(a-b)$, and a and b represent the displacements of the basic cell along the x- and y-directions. When this N×N threshold matrix is prepared, a uniform density and uniform recording dot pattern can be obtained.

In this manner, in the present invention, a uniform recording dot pattern can be formed, and therefore a high quality image output can be obtained.

Since the desired screen angle can be obtained by properly setting the values of a and b, a color image of uniform recording dot pattern free from moiré pattern can be obtained.

A third embodiment of the present invention will now be described. This embodiment is for converting (masking or the like) image data using a table (memory) of relatively small capacity and is suitable for the complementary color conversion circuit 8 or the blacking-/UCR circuit 9 shown in FIG. 6. Numerals on the signal lines indicates the number of bits. In this embodiment, the input image data is assumed to consist of 6 bits. However, the number of bits of each pixel is not limited to 6 but the same result can be obtained with another member.

Figure 26:
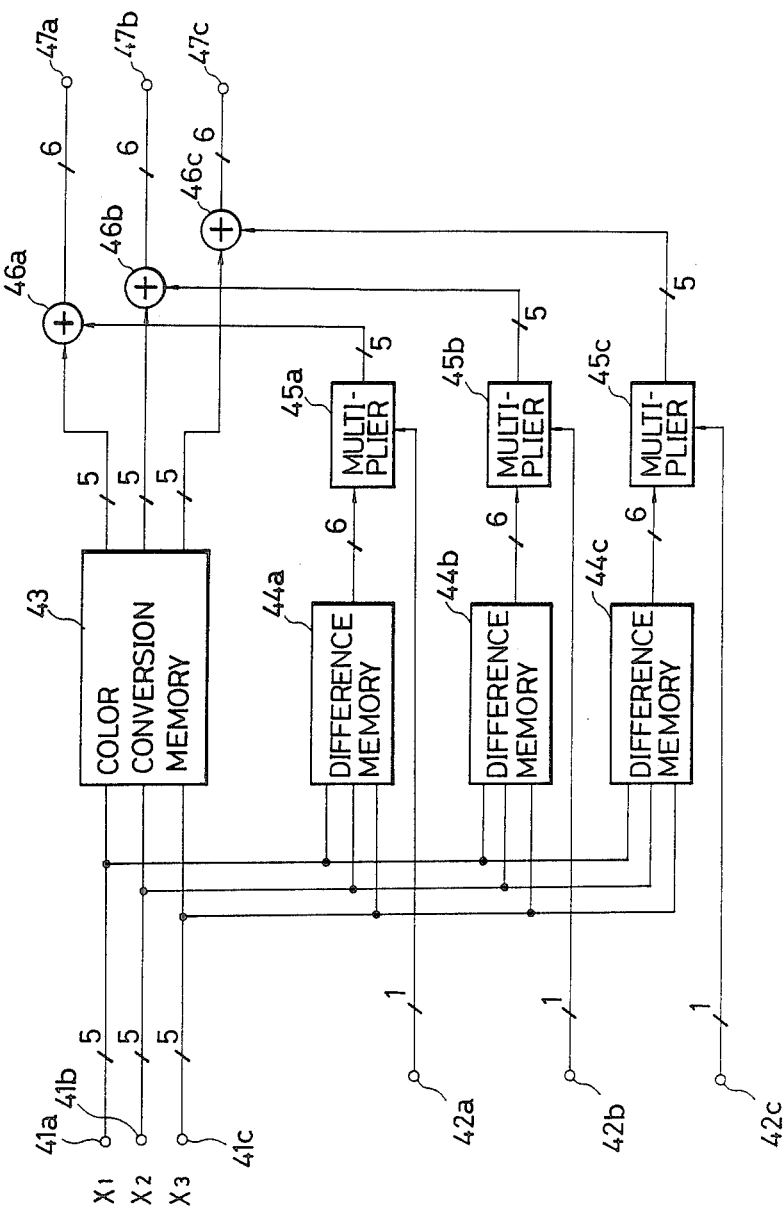
FIG. 26 is a block diagram showing an example of an image processing apparatus.

FIG. 26 shows a block diagram of the third embodiment of the present invention. Tricolor 6-bit image data (yellow (Y), magenta (M), and cyan (C)) are divided into upper 5-bit data 41a, 41b and 41c and the least significant bit data 42a, 42b, and 42c. The upper 5-bit data 41a, 41b and 41c (a total of 15 bits) are supplied to a color conversion memory 43 as input address signals X1, X2, and X3.

Output data at such addresses of the memory 43 are 5-bit output data (a total of 15 bits). Accordingly, the total capacity of the color conversion memory 43 is calculated to be:

$$2^{15} \times 3 \times 5 = 491,520 \text{ bits (about 61 kbytes)}$$

Meanwhile, the least significant bit data 42a, 42b and 42c are used for linear interpolation.

It is now assumed that difference memories 44a, 44b and 44c store values of ½ the differences of the data of the respective colors after conversion. Interpolation data:

$$\Delta \mathbb{D}/2 = (\mathbb{D}' - \mathbb{D})/2$$

(where $\Delta \mathbb{D}$ is a difference between data at addresses $\mathbb{X}$ and $\mathbb{X} + 1$) is calculated from a value $\mathbb{D}$ (5 bits) of one color among the output data from the memory 43 for an input address:

$$\mathbb{X} = \{X1, X2, X3\}$$

and a value $\mathbb{D}'$ (5 bits) of one color among output data from the memory 43 for an input address $\mathbb{X} + 1$. The obtained value is stored in the difference memories 44a, 44b and 44c.

5-bit output data $\mathbb{D}'$ for the address input $\mathbb{X}$ is obtained from the color conversion memory 43, and the 5-bit output data $\Delta \mathbb{D}/2$ is obtained from the difference memories 44a, 44b and 44c. (In practice, since the signs ± are attached to $\Delta \mathbb{D}/2$, the output data from the difference memories consists of 6 bits).

Multipliers 45a, 45b and 45c multiply the output data from the difference memories 44a, 44b, and 44c with the least significant bit data 42a, 42b and 42c. Products from the multipliers 45a, 45b and 45c are supplied to adders 46a, 46b and 46c, which also receive output data from the color conversion memory 43.

Outputs 47a, 47b and 47c from the multipliers 46a, 46b and 46c become:

Output data = $\mathbb{D} + \Delta \mathbb{D}/2$ when the least significant bit data = 1

Output data = $\mathbb{D}$, when the least significant bit data = 0

In this manner, the data is interpolated by the values of the least significant bits. When the data $\Delta \mathbb{D}/2$ is interpolated in this manner, better conversion data can be obtained than in the case wherein the number of data bits is decreased.

In this embodiment, the multipliers 45a, 45b and 45c can also be multiplexers since only switching between the two data $\Delta \mathbb{D}/2$ and 0 need be performed.

FIGS. 27A and 27B show the actual operations of the adders 46a, 46b and 46c.

All the 5-bit output data from the color conversion memory 43 are positive. In order to indicate this, a most significant bit (MSB) b6 of the data is set to be "0".

For the reason to be described below, "0" is also set at the least significant bit (LSB) b0, and output data consists of a total of 7 bits between b0 and b6.

The output data from the difference memories 44a, 44b and 44c consist of 6 bits as a borrow may be caused when data A-B (where A and B are output data for one color from the color conversion memory 43 for input addresses $\mathbb{X}$ and $\mathbb{X} + 1$ respectively and consist of 5 bits) is calculated. Furthermore, since the data is divided by 2, the data is shifted to the right by one digit and stored.

This is equivalent to the case wherein a point (i.e., decimal point) is shifted to the left by one bit. Accordingly, another bit is added to the MSB of the data from the difference memories 44a, 44b and 44c so as to obtain 7-bit data.

If the value of the bit b5 shown in FIG. 27 is 1, that is, negative, the MSB = 1. On the other hand, when the value of the bit b5 is 0, the MSB = 0.

Accordingly, the adders 44a, 44b and 44c perform addition of 7-bit inputs. The contents of the lower 6 bits b0 to b5 of the sum are obtained as data.

In this manner, interpolation of 5-bit color conversion data can be easily performed.

The memory capacity of the difference memories 44a, 44b and 44c for each color is:

$$2^{15} \times 6 = 196,608 \text{ bits}$$

and that for the three colors is:

$$Nd = 589,824 \text{(bits)} \approx 74 \text{(kbytes)}$$

When the memory capacity $2^{15} \times 3 \times 5 \approx 61$ (kbytes) is added to this value, the total memory capacity is seen to be about 135 kbytes.

When this is compared to the total memory capacity $N \approx 590$ kbytes required when interpolation as described above is not performed, a reduction ratio:

$$135/590 = 0.23$$

is obtained. Accordingly, we can see that the total memory capacity can be decrased to about 23%.

When there is no negative value in the contents of the difference memories 44a, 44b and 44c (e.g., when the color conversion is monotone increasing or decreasing and does not have poles), the first bit representing negative value is not required. Then, the output from the difference memories 44a, 44b and 44c can be 5 bits. Accordingly, the term $2^{15} \times 6$ can be reduced to $2^{15} \times 5 = 163,840$ bits. In this case, the total memory capacity can be about 123 kbytes. Then, the memory capacity can be decreased to about 21% of the conventional 590 kbytes.

FIG. 28 shows a case wherein the 6-bit input pixel data is divided into upper 4 bit data 61a, 61b and 61c and lower 2 bit data 62a, 62b, and 62c.

The configuration shown in FIG. 28 is different from that shown in FIG. 26 in that the capacity of a color conversion memory 63 in this case can be:

$$2^{12} \times 3 \times 4 = 49,152 \text{ bits}$$

and difference memories 64a, 64b and 64c store interpolation data $\Delta \mathbb{D}/4$.

In this embodiment, multipliers 68a, 68b and 68c multiply output data from the difference memories 64a, 64b and 64c with the lower two bit data 62a, 62b and 62c. The products are supplied to adders 66a, 66b and 66c.

The total memory capacity of the difference memories 64a, 64b and 64c is calculated to be:

$$2^{12} \times 3 \times 5 = 61{,}440 \text{ bits}$$

plus the 49,152 bits which is about 14 kbytes. Accordingly, the reduction ratio of memory capacity as compared to the conventional case of 590 kbytes is about 14/590=0.024. Thus, the memory capacity is reduced to 2.4% of the conventional case.

In this case, the adders 66a, 66b and 66c perform 7-bit data addition. This is because the sign bit is added to the MSB of the color conversion memory 63, and since the data is divided by 4 due to a borrow of 4-bit interpolation data and is shifted to the right by two bits. Accordingly, addition is performed with 7-bit data, and only the lower 6-bit data of the sum is used.

In accordance with the present invention, arithmetic operations for color processing or correction can be performed at high speed and in a simple manner using memories. This processing can be applied not only to the general masking processing but also to black signal synthesis processing, undercolor removal (UCR) or the like. The processing can also be applied to the LUT 6 described above.

Figure 29:
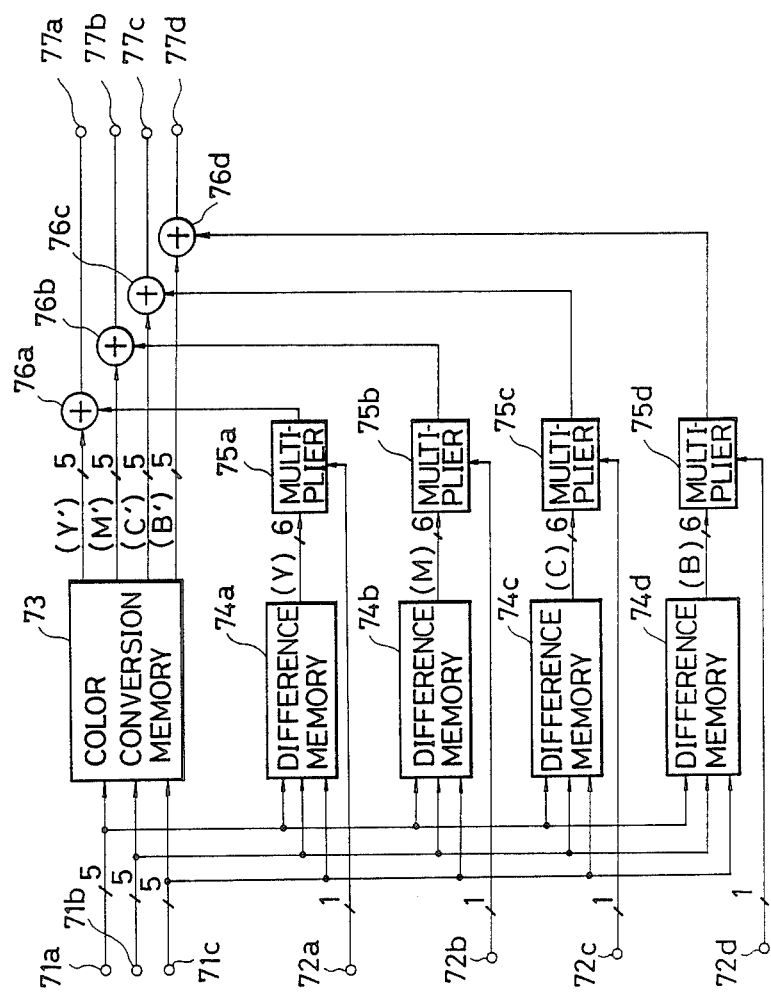

When such black signal synthesis processing or UCR is to be performed, as shown in FIG. 29, a black difference memory 74d is added in addition to difference memories 74a to 74c such as are shown at 44a to 44c in FIG. 26. A black output from the difference memory 74d is supplied to a multiplier 75d. The tricolor inputs (e.g., the upper 5 bits of Y, M and C signals) are supplied to the difference memories 74a to 74d. Reference numerals 72a to 72c denote the least significant bit data of each color. In this embodiment, a circuit (not shown) for detecting the minimum value of Y, M and C is included, and the least significant bit of this minimum value is supplied to the multiplier 75d.

In this case, the color conversion memory 73 obtains data after masking, black synthesis and UCR processing from the tricolor inputs 71a to 71c and supplies this data to adders 76a to 76d. The adders 76a to 76d also receive the outputs from the multipliers 75a to 75d and supply the sum data as output data 77a to 77d for the three colors Y, M and C and black B.

The memory capacity of the color conversion memory 73 is calculated to be:

$$2^{15} \times 4 \times 5 = 655{,}360 \text{ bits} (\approx 82 \text{ kbytes})$$

Meanwhile, the total memory capacity of the difference memories 74a to 74d is calculated to be:

$$2^{15} \times 4 \times 6 = 786{,}43 \text{ bits} (\approx 98 \text{ kbytes})$$

Thus, the total memory capacity can be about 180 kbytes.

Since 180 (kbytes)×8(kbits/kbytes)÷64(kbits)=22.5 such a memory capacity can be easily attained by using several tens of dynamic RAMs of 64 kbits.

In accordance with the present invention, memories used preferably are rewritable RAMs so that data can be updated under the control of a CPU. This is because the contents of the RAMs must be changed when the reader is changed to another type of reader.

The color conversion table can be prepared by the CPU first, and can then be transferred to the RAMs.

The equations for preparing the table can be general masking equations, e.g., Clapper equations. Parameters to be used in such conversion are determined in accordance with an output device selected for each application. When any parameter is changed, the calculations must be performed again, and the data of the RAMs must therefore be updated accordingly.

FIG. 30 shows another embodiment of the present invention. Referring to FIG. 30, 6-bit tricolor image data 81a, 81b and 81c for the same pixel correspond to yellow (Y), magenta (M) and cyan (C), respectively. These tricolor image data 81a, 81b and 81c are supplied to color conversion memories 83a, 83b and 83c as address signals. At this time, the Y data supplied to the memory 83a consists of 6 bits, the Y data supplied to the memory 83b consists of upper 5 bits, and that supplied to the memory 83c consists of upper 5 bits. When Y data conversion, for example, is to be performed, the Y input data 81a has the strongest influence on processing, and the other input data 81b and 81c have less strong influence. Accordingly, nearly ideal Y output data can be obtained even if the address numbers for M and C are decreased.

The output data from the memory 83a by addressing as described above consists of 6-bit Y color conversion data. Accordingly, the capacity of the memory 83a is calculated to be:

$$2^{6+5+5} \times 6 = 393{,}216 \text{ bits} (\approx 40 \text{ kbytes})$$

This corresponds to about six 64 kbit dynamic RAMs.

Similarly, the memories 83b and 83c of a similar capacity are also required for C and M. Accordingly, the total memory capacity required becomes:

$$49 \text{ (kbytes)} \times 3 = 147 \text{ (kbytes)}$$

When a comparison is made between this memory capacity with the conventional capacity, 590 kbytes, the reduction ratio of:

$$147/590 = 0.25$$

is obtained, thus reducing the memory capacity to about ¼.

In the memories 83a, 83b and 83c, data calculated by the CPU or the like must be stored in advance. Such data can be obtained by:

$$Y = f1(Y, M, C)$$

$$M = f2(Y, M, C)$$

$$C = f3(Y, M, C)$$

These relations are so-called masking equations and are obtained from the Clapper equations depending upon the characteristics of the output device selected, characteristics of inks, toners, and the like.

These relations are generally non-linear. According to the table index method adopted in the present invention, if such data is calculated by the CPU or the like in advance, calculation in accordance with these equations can be performed at high speed.

In accordance with the present invention, color processing, color correction and the like can be performed at high speed and with ease requiring only a small memory capacity, so that color processing can be performed at high speed and at less cost.

The present invention is not limited to the above embodiments, and various changes and modifications may be made within the spirit and scope of the present invention.

What is claimed is:

1. An image processing apparatus comprising:
generating means for generating predetermined image data representing an image;
reproducing means for reproducing the image;
reading means for reading the image reproduced by said reproducing means and for generating read data representative thereof; and
converting means for converting the read data generated by said reading means to converted image data such that the converted image data is substantially equal to the predetermined image data, the converted image data being transmissible to said reproducing means, said converting means including a table adapted to receive the read data as address data for converting and outputting the converted image data, and said reproducing means being arranged to reproduce the image represented by either the predetermined image data or the converted image data.

2. An apparatus according to claim 1, wherein said table includes memory means for receiving the read data generated by said reading means as address data.

3. An apparatus according to claim 1, wherein said reproducing means comprises a printer for printing an image on a record medium by utilizing a beam modulated on the basis of image data.

4. An apparatus according to claim 1, further comprising switch means for selecting either the predetermined image data generated by said generating means or the converted image data converted by said converting means for supply to said reproducing means.

5. An apparatus according to claim 1, wherein said generating means generates predetermined color image data, said reproducing means is capable of forming a color image in accordance with the predetermined color image data, and said reading means reads the color image to generate color read data.

6. An apparatus according to claim 5, wherein said table is a look-up table adapted for storing the predetermined color image data and for receiving the color read data as an address to output the predetermined color image data.

7. An apparatus according to claim 6, wherein said reading means comprises a CCD line image sensor and a log conversion circuit.

8. An apparatus according to claim 7, wherein said reproducing means includes a complementary color conversion circuit.

9. An image processing apparatus comprising:
input means for inputting image data; and
means for digitizing the image data input by said input means;
said digitizing means having dither processing means for performing dither conversion of the image data in accordance with a dither matrix composed of plural kinds of basic cells of threshold values, each cell being of the same shape but having different arrangements of threshold values, said plural kinds of basic cells being alternately arranged in two orthogonal directions and being shifted relative to one another in row and column directions of said dither matrix by a and b, respectively, where a and b represent displacements between the plural kinds of basic cells, a and b each having a value other than zero;
the dither matrix having a size $N \times N$ determined in accordance with $N = m(a+b) + n(a-b)$ where m and n are minimum values of integers which satisfy $m/n = (a+b)/(a-b)$.

10. An apparatus according to claim 9, wherein said dither processing means comprises memory means for storing the dither matrix and comparing means for comparing the image data input by said input means with threshold values of the dither matrix read out from said memory means to output a binary signal.

11. An apparatus according to claim 10, further comprising image forming means for forming an image on a record medium by switching on and off a beam on the basis of the binary signal, the threshold values of said dither matrix being selected in accordance with the performance of an image forming operation by said image forming means.

12. An apparatus according to claim 11, wherein said input means is capable of inputting color image data representing different color components, and said dither processing means utilizes a different dither matrix for each color component so as to enable said image forming means to form an image having a different screen angle for each color component.

13. An image processing apparatus comprising:
input means for inputting multi-bit image data;
first converting means for receiving as an address the upper l bits of the image data input by said input means in order to output converted image data;
second converting means for receiving as an address the upper m bits of the image data input by said input means in order to output converted data; and
correcting means for correcting the converted image data by utilizing the converted data from said second converting means and the lower n bits of the image data input by said input means.

14. An apparatus according to claim 13, wherein the number of upper bits l is equal to the number of upper bits m, and said first and second converting means each receive the upper l bits of the image data as an address to output the converted image data and the converted data, respectively.

15. An apparatus according to claim 13, wherein said input means inputs first and second color image data corresponding to respective first and second color components, and said first converting means receives as an address the upper l bits of the first color image data and the upper l bits of the second color image data to output converted color image data of third and fourth color components corresponding to the first and second color components, respectively.

16. An apparatus according to claim 15, wherein said second converting means has first memory means for receiving as an address the upper l bits of the first color image data and the upper l bits of the second color image data to output converted data corresponding to the third color component, and said correcting means corrects the converted color image data of the third color component by utilizing both the converted data corresponding to the third color component outputted from said first memory means and the lower n bits of the first color image data.

17. An apparatus according to claim 16, wherein said second converting means further comprises second memory means for receiving as an address the upper l bits of the first color image data and the upper l bits of the second color image data to output converted data corresponding to the fourth color component, and said correcting means corrects the converted color image data of the fourth color component by utilizing both the converted data corresponding to the fourth color component outputted from said second memory means and the lower n bits of the second color image data.

18. An apparatus according to claim 17, wherein said correcting means comprises first operation means for performing an operation on the converted data corresponding to the third color component, the lower n bits of the first color image data and the converted color image data of the third color component, and second operation means for performing an operation on the converted data corresponding to the fourth color component, the lower n bits of the second color image data and the converted data corresponding to the fourth color component.

19. An apparatus according to claim 13, wherein said first converting means outputs converted image data which are mask processed.

* * * * *

UNITED STATES PATENT AND TRADEMARK OFFICE
CERTIFICATE OF CORRECTION

PATENT NO. : 4,752,822
DATED : June 21, 1988
INVENTOR(S) : NAOTO KAWAMURA

It is certified that error appears in the above-identified patent and that said Letters Patent is hereby corrected as shown below:

AT [57] IN THE ABSTRACT

Page 2, column 1, line 5, "M and N" should read --m and n--.
Page 2, column 1, line 6, "M/N=(a+b-" should read --m/n=(a+b- --.
Page 2, column 1, line 7, ")/a-b)." should read --)/(a-b).--.
Page 2, column 1, line 11, "date" should read --data--.

COLUMN 5

Line 57, "Di' give" should read --Di' given--.

COLUMN 6

Line 60, " T'" should read --DT'--.
Line 66, " T→DT'" should read --DT→DT'--.

COLUMN 7

Line 4, "DT=f$^{-1}$(DT)    (2)" should read --DT=f$^{-1}$(DT')    (2)--.
Line 15, "data  T'" should read --data DT'--.
Line 25, "DT'" should read --DT'--.
Line 28, "( b'-Da'+2$^\Delta$)/(Db-Da)>0" should read --(Db'-$\overline{Da}$+2$^\Delta$)/(Db-Da)>0--.
Line 34, "Da and Db" should read --Da and Db--.

COLUMN 8

Line 34, "an" should be deleted.

UNITED STATES PATENT AND TRADEMARK OFFICE
CERTIFICATE OF CORRECTION

PATENT NO. : 4,752,822
DATED : June 21, 1988
INVENTOR(S) : NAOTO KAWAMURA

Page 2 of 3

It is certified that error appears in the above-identified patent and that said Letters Patent is hereby corrected as shown below:

COLUMN 10

Line 16, "FIG. 2-A" should read --FIG. 20-A--.

COLUMN 11

Line 1, "O=(0,0)," should read --$\vec{O}$=(0,0),--.

COLUMN 12

Line 64, "indicates" should read --indicate--.

COLUMN 13

Line 36, "D'" should read --$\mathbb{D}$--.
Line 49, "multipliers 46a," should read --multipliers 45a,--.
Line 50, "46b and 46c" should read --45b and 45c--.
Line 66, "data   from" should read --data $\mathbb{D}$ from--.

COLUMN 14

Line 2, "data" should read --data $\mathbb{D}$--.
Line 20, "adders 44a, 44b and 44c" should read --adders 46a, 46b and 46c--.
Line 44, "decrased" should read --decreased--.
Line 57, "4 bit" should read --4-bit--.
Line 58, "2 bit" should read --2-bit--.

UNITED STATES PATENT AND TRADEMARK OFFICE
CERTIFICATE OF CORRECTION

PATENT NO. : 4,752,822
DATED : June 21, 1988
INVENTOR(S) : NAOTO KAWAMURA

It is certified that error appears in the above-identified patent and that said Letters Patent is hereby corrected as shown below:

COLUMN 15

Line 1, "two bit" should read --two-bit--.
Line 55, "$2^{15} \times 4 \times 6 = 786,43$ bits ($\approx 98$ kbytes)" should read --$2^{15} \times 4 \times 6 = 786,432$ bits ($\approx 98$ kbytes)--.

COLUMN 16

Line 30, "$2^{6+5+5} \times 6 = 393,216$ bits ($\approx 40$ kbytes" should read --$2^{6+5+5} \times 6 = 393,216$ bits ($\approx 49$ kbytes--.

Signed and Sealed this

Fifteenth Day of August, 1989

Attest:

DONALD J. QUIGG

Attesting Officer

Commissioner of Patents and Trademarks